Sept. 25, 1928.

H. SYVERTSEN 1,685,181

BEARING FOR HYDRAULIC TURBINE SHAFTS

Filed Sept. 2, 1924

Inventor
Harald Syvertsen
By
Attorney

Patented Sept. 25, 1928.

1,685,181

UNITED STATES PATENT OFFICE.

HARALD SYVERTSEN, OF YORK, PENNSYLVANIA, ASSIGNOR TO S. MORGAN SMITH COMPANY, OF YORK, PENNSYLVANIA, A CORPORATION OF PENNSYLVANIA.

BEARING FOR HYDRAULIC-TURBINE SHAFTS.

Application filed September 2, 1924. Serial No. 735,448.

This invention relates to a bearing for hydraulic turbine shafts and the like and particularly to an adjustable guide bearing of the cone type.

In the preferred form of this improved bearing lignumvitæ bearing strips or elements are used in view of the advantages of this particular dense wood.

Theoretically, a water wheel is balanced hydraulically. Mechanically, all runners are balanced as perfectly as possible in the shop where they are constructed prior to installation. Practically, owing to their complicated shapes and sections, runners cannot be placed in absolutely perfect balance and will cause wear on the bearing. The unbalance of the runner may be accentuated by the unbalance of the shaft, due to the difference in density of the material of which the shaft is composed. The forces due to mechanical unbalance exert the same wearing effect upon the bearing at each vertical section or strip of its surface; that is, the wear is equal in all radial directions. There is always a very slight clearance between the bearing and the shaft, and due to mechanical unbalance the center of the shaft will describe a circle with a radius equal to this clearance. As the bearing wears, the circle which the center of the shaft follows will become larger and larger in diameter, and if the material of the bearing were such that each vertical section or strip thereof had the same resistance to wear, the bearing could be properly adjusted according to well known structures. However, owing to the difference in material in the bearing, it is necessary to provide means for separate adjustment, or a bearing of the type specified having independently adjustable sections. Furthermore, from a hydraulic standpoint, the runner is theoretically balanced, but actually, owing to influences exerted by the flumes in which the runners are set and imperfections in the runners after they are cast and slightly different openings between the gates as well as in view of other structural disadvantages, it has been found that the hydraulic balance of the runner is never perfect, so that there is more wear on one side of the bearing than on the other. Eccentric wear may be caused by imperfect alinement of shaft or bearings. Where bearings are used composed of continuous or enclosing sleeve-like devices, if there is more wear on one side of the bearing than on the other when adjustment is made, such adjustment has the effect of drawing the shaft slightly to one side of its original position.

By means of the improved bearing the disadvantages incident to a continuous enclosing bearing element are overcome, and the object of this invention is to provide means whereby adjustment can be made as the bearing wears and the clearance becomes greater than it should be to maintain a shaft in practically perfect alinement and the runner in its proper position with respect to the wheel case when the improved bearing is used with a turbine shaft.

A further object of the improvement is to provide an organization which may be quickly and easily adjusted, so that the turbine does not have to be shut down or kept out of operation for any considerable length of time, and in fact provide a bearing whereby it is possible, by using care, to adjust the same while the turbine is running and in actual commercial service.

The invention will be particularly explained in the subjoined description as embodying lignumvitæ or other analogous wooden strips to serve as bearing surfaces, but it will be understood that babbitt, bronze or any special bearing metal or material may be used. Where lignumvitæ or other analogous wooden strips are used, the bearing will in general be lubricated with water, but oil or grease may also be used, and, likewise, when metal bearing surfaces or elements replace the lignumvitæ, the same may be lubricated with a suitable substance.

In the drawings one practical embodiment of the invention is disclosed and illustrated as being applied to a turbine shaft, but the bearing elements may be equally well used in connection with any other shaft and it is proposed to install the improved bearing in association with any shaft with which it may be found advantageous in the performance of its function.

Figure 1:
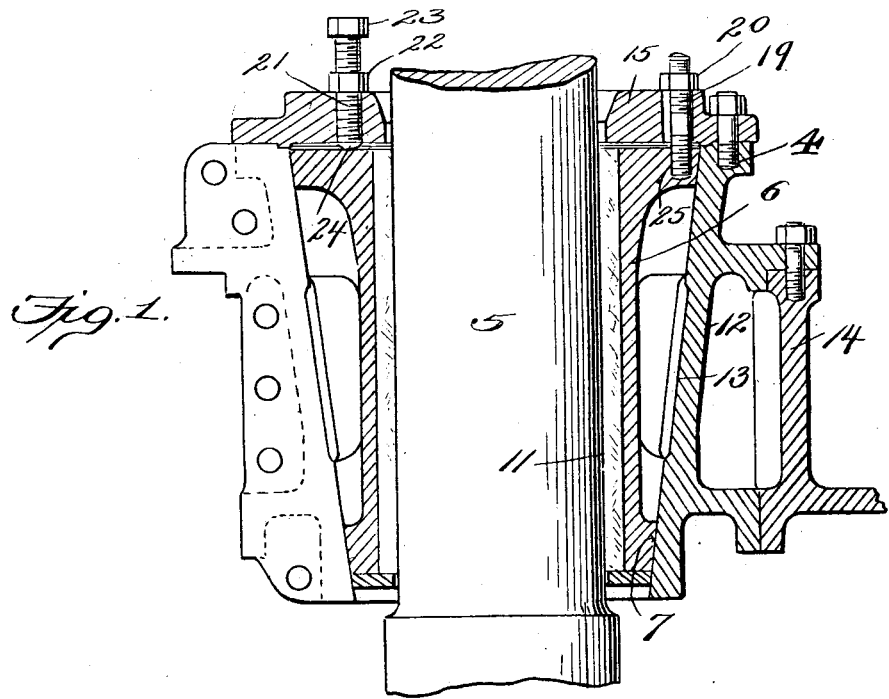
Fig. 1 is a transverse vertical section through the upper part of the enclosing frame of a hydraulic turbine, showing the improved bearing applied to a part of the turbine shaft, the section being taken on the line 1—1, Fig. 2.
Figure 2:
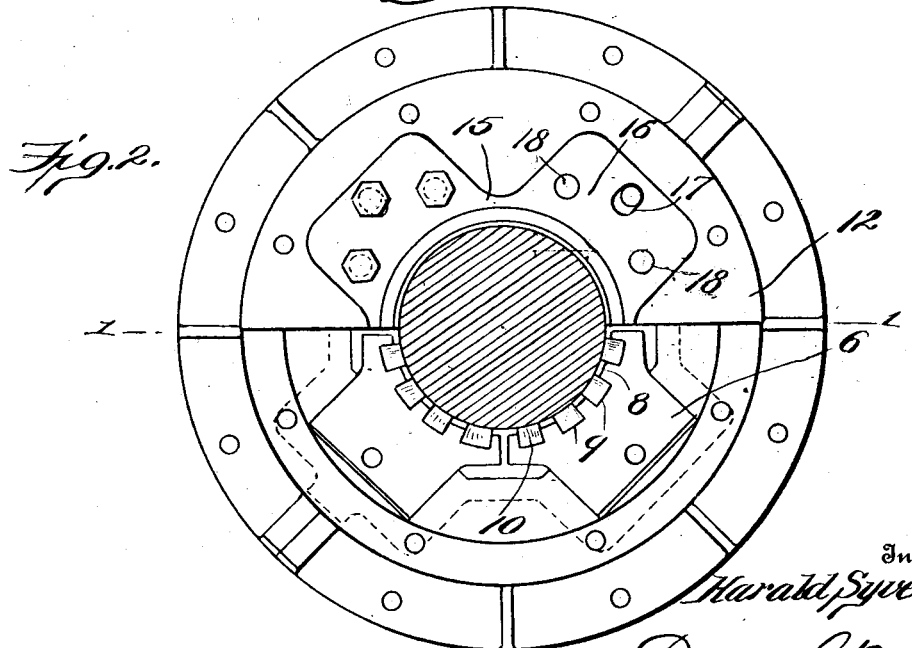
Fig. 2 is a horizontal section through a turbine shaft and a part of the bearing and showing half of the cover removed to illustrate two of the independently adjustable bearing sections or elements.

The numeral 5, in the application of the features of the invention as shown in the drawings, designates a turbine shaft which revolves in the improved bearing. The improved bearing consists of a plurality of segmental shoes 6, each having an outer inclined or conical surface 7 tapering towards the lower end thereof and having on the inner concave side 8 a plurality of seats or channels 9, in which are preferably fitted lignumvitæ strips 10, projecting inwardly therefrom and formed with inner bearing surfaces 11, which follow in their arrangement the convex surface of the portion of the shaft which they embrace. In the present instance four of the segmental shoes 6 are illustrated as being comprised in the complement of the improved bearing, but it will be understood that this number of shoes may be varied in accordance with the dimensions of the bearing without in the least departing from the structural efficiency and function of the shoes. The shoes 6 are mounted in an outer container 12 having an inner inclined or conical face 13 tapering towards the bottom thereof and corresponding to the inclined or conical surfaces of the outer sides 7 of the shoes. The container 12 is rigidly fastened to a top plate 14, which constitutes a part of the casing around the usual form of runner. Over the upper ends of the shoes 6 and the upper rim 4 of the container 12 a cover plate 15 is mounted around the shaft 5 and has a series of pads or bosses 16 corresponding in number to the number of shoes 6, and in the center of the outer portion of each of the pads 16 a radial slot 17 of suitable length and width is formed, and at a predetermined distance inwardly on opposite sides of the center of each pad 16 screw openings 18 are formed. The radial slots 17 in the centers of the members 16 of the cover plate 15 are each engaged by an adjusting bolt 19 provided with a nut 20, and the openings 18 are engaged by adjusting screws 21 having set nuts 22 thereon, one on each, each screw 21 having an upper head 23 and a lower reduced end 24. The bolts 19 are threaded into the upper portions of the shoes 6, as at 25, and the adjusting screws 21 have their lower reduced ends in contact with the upper end surfaces of the shoes, as shown by Fig. 1.

As hereinbefore indicated, it is preferred that the bearing strips 10 be formed of lignumvitæ but these strips may be replaced by strips of other material, such as, for instance, suitable metal, and the shoes are also preferably formed of bronze, though it is proposed when desired and found practicable in some applications to construct these shoes of cast iron with bronze strips secured thereto, as is well understood in this art. In the preparation of the components of the improved bearing, the engaging surfaces 7 of the shoes 6 and the face or surface 13 of the container 12 are planed, these two engaging surfaces holding the adjustable elements or strips at each side and preventing rotation as well as holding each strip in perfect alinement with relation to the center of the shaft. After all of the strips 10 are mounted and rigidly held in shoes 6, the bearing surface provided by the inner edges of the several strips as a unit is bored with the exact clearance required with respect to the diameter of the shaft 5. The adjustment of the shoes 6 is accomplished through the operation of the bolts 19 and screws 21, the shoes 6 with the strips 10 being shifted longitudinally with relation to the shaft by the operation of the screws 21 by first loosening the nuts 20 on the bolts 19. Primarily the bearing components will be set with proper clearance with relation to the shaft 5. After the bearing has been in service for sometime and has become worn and it is desired to adjust the same, the shoes 6 carrying the strips 10 are moved downwardly a distance sufficient to bring each series of strips 10 the correct distance from the true and intended center line of the shaft. Each shoe 6 may be independently adjusted, and it may be found necessary at times to give one shoe a greater longitudinal adjustment than the remaining shoes, and another shoe a little less longitudinal adjustment, which all depends upon the amount of wear that may have ensued with relation to the inner edges of the strips 10. By manipulating the adjusting bolts and screws, each shoe with its complement of strips 10 can be positioned with exactitude as intended with relation to the shaft, and the surfaces 7 and 13, respectively, of the shoes 6 and container 12 will have sliding fits which must be accurate enough to avoid any play. After the adjustment of the shoes 6 and their complement of strips 10 has been made as required, the bolts 19 will be tightened through the medium of the nuts 20 so that the shoes cannot be moved or work out of their adjusted position, and in view of the radial slots 17, it is obvious that the shoes 6 may shift towards the center of the shaft in proportion to the amount of wear on the inner edges of the strips 10, and as a consequence the improved bearing is adjustable both in a longitudinal and horizontal or radial direction. The formation of the radial slots 17 of oblong form in the members 16 of the cover plate 15 is an important structural feature, in view of the fact that the said slots provide for the proper clearance and compensate for wear of the bearing strips 10, with obvious advantages in durability or longer service of the improved bearing. Moreover, each adjusting bolt 19 supports the weight of each shoe and is located far enough towards the outside of the shoe to dispose the center of gravity of the shoe between the adjusting bolt and the bearing surface. The greater portion of the weight of the shoe being towards the center line of the shaft will cause each shoe to lie in its proper position in the container or housing 12, and since there is no force of any kind tending to displace the shoe from this position, the weight normally will be enough to hold the shoe in place, and as a consequence the running clearance between the shaft and the bearing surface or the inner edges of the strips 10 will be maintained.

When the adjusting bolts and screws are tightened, each shoe will be forced firmly against the tapered finished surface 13 of the container or housing 12, for the reason that an upward lift through the medium of each adjusting bolt on the outside of the top of the shoe will ensue and at the same time there will be a downward pressure exerted by the adjusting screws towards the inside of the top of the shoe.

It is preferred, though not absolutely necessary, that the adjusting bolts 19 and screws 21 be formed of brass, and it will also be understood that all the parts that have not heretofore been particularly specified as to the materials used in their construction will be formed of suitable metal. The improved bearing is composed of a comparatively few number of parts, which are capable of easy operation and adjustment control, and in applying the improved bearing to various sizes of shafts and turbine installations generally, it will be understood that modifications in the proportions and dimensions may be adopted at will without departing from the spirit of the invention.

What is claimed as new is:

In a bearing of the class specified, the combination with a shaft and a container fitted over and having an inclined surface surrounding the shaft, of a plurality of longitudinally and horizontally adjustable shoes interposed between the container and the shaft and formed with inner straight surfaces and outer inclined surfaces having a continual contact and sliding fit with the inclined surface of the container, the shoes having bearing devices extending full length of the inner side thereof and surrounding and directly engaging the shaft, a sectional annular cover mounted over and close to one set of ends of the shoes, said cover formed with radial pads and each pad having an outer centrally located radial slot and a pair of openings in transverse alinement inwardly at a distance from the slot, the pads being over the ends of the shoes and corresponding in number to the number of the latter, and means for individually adjusting and fixing the adjustment of the shoes and their bearing devices, consisting of an outer adjusting bolt engaging the slot of each pad and a pair of adjusting screws engaging the said openings at a distance inward from the bolt, the adjusting bolt of each pad being secured to the adjacent extremity of its shoe and the adjusting screws having their inner ends contacting with but unsecured to the end of the adjacent shoe, the bolts and screws of all the pads being operable to modify the adjustment of the shoes without releasing the cover, the adjusting bolts supporting the weight of the shoe located at such distance outwardly from the outside of the shoe to dispose the centers of gravity of the shoes between the said bolts and the inner bearing devices, the outer edges of the cover being secured to the container outside of the said adjusting bolts.

In testimony whereof I have hereunto set my hand.

HARALD SYVERTSEN.